Dec. 6, 1927.
M. JONES ET AL
1,652,014
ADJUSTABLE BEARING
Filed Aug. 18, 1926
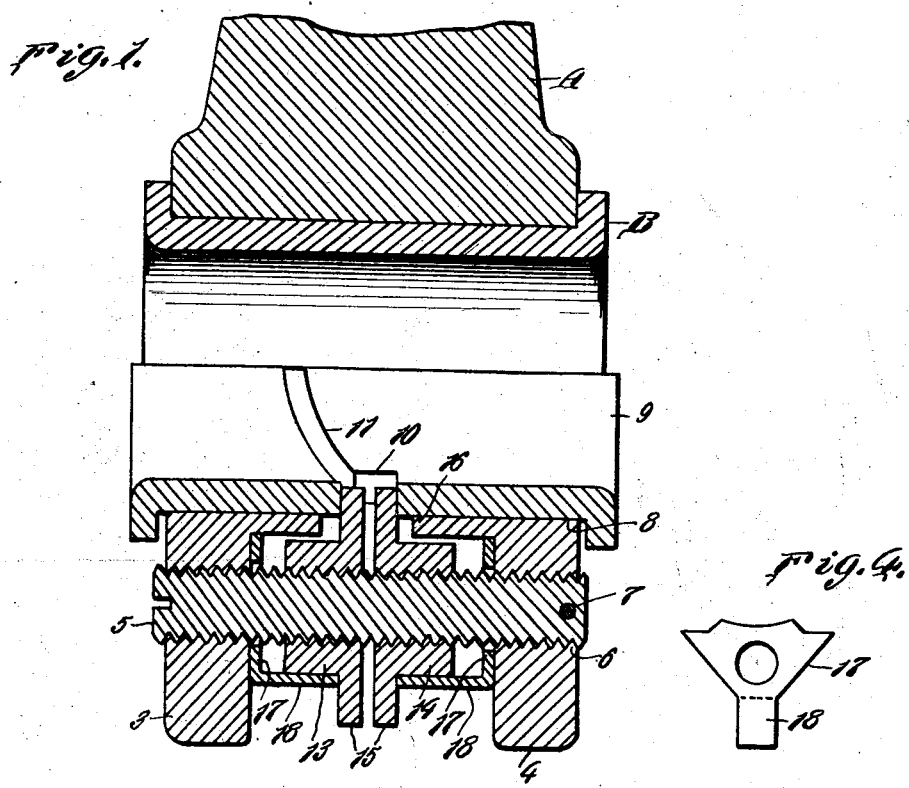
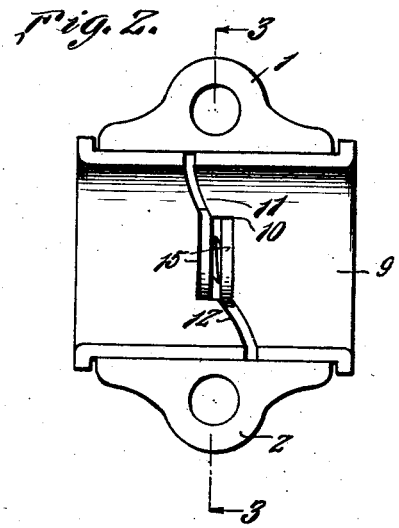
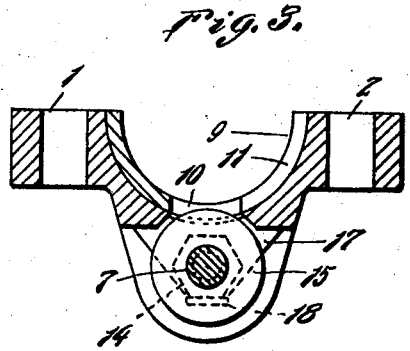
Martha Jones
T. H. Forehand
INVENTORS
BY Victor J. Evans
ATTORNEY Patented Dec. 6, 1927.

1,652,014

UNITED STATES PATENT OFFICE.

MARTHA JONES, OF AKRON, OHIO, AND THOMAS H. FOREHAND, OF NASHVILLE, TENNESSEE.

ADJUSTABLE BEARING.

Application filed August 18, 1926. Serial No. 130,072.

This invention relates to adjustable bearings and its primary object is to provide a bearing especially designed to take up lateral play or wear.

A further object of the invention is to provide a bearing adjustable to compensate for lateral play or wear in crank shafts or the like.

Another object of the invention is to provide a bearing that can be expeditiously adjusted without removing any part thereof, and one that is simple, durable and formed of few parts to accomplish its intended function.

This invention also consists in certain other features of construction and in the combination and arrangement of the several parts, to be hereinafter fully described illustrated in the accompanying drawings and specifically pointed out in the appended claims.

In describing our invention in detail, reference will be had to the accompanying drawings wherein like characters denote like or corresponding parts throughout the several views, and in which:

Figure 1 is a vertical sectional view taken through the bearing which forms the subject matter of the present invention.

Figure 2 is a top plan view.

Figure 3 is a sectional view taken on line 3—3 of Figure 2.

Figure 4 is a fragmentary side elevation of the locking shim which forms a part of the invention.

Referring to the drawings in detail the letter A indicates a fragmentary portion of a connecting rod of an internal combustion engine and which is provided with the usual semi-circular recess to accommodate the upper half of the lining B which is formed of Babbitt metal or the like.

The cap for the connecting rod forms our invention and includes the oppositely disposed apertured ears 1 and 2 which are secured to like ears formed on the lower end of the connecting rod for securing the cap thereto through the instrumentality of bolts and the like not shown. The cap includes depending portions 3 and 4 respectively which are provided with registering threaded openings 5 and 6 to accommodate a threaded bolt 7 being formed at one end with a kerf to accommodate a screw driver and the like and its opposite end is provided with an opening through which is passed a cotter pin for securing the bolt in adjusted position, and the cotter pin is arranged in a slot to prevent the turning thereof as will be readily apparent. The cap is provided with the usual semi-circular recess to accommodate the lower half of the lining 9 which as clearly shown in Figure 2 is formed in two parts each of which has its inner end recessed as at 10 and formed with oppositely disposed inclined confronting edges 11 and 12.

Each part of the lining 9 is movable laterally for the purpose of taking up end play in the crank shaft and to accomplish this purpose there are threadedly secured to the bolts 7 a pair of nuts 13 and 14 which have formed on their confronting faces, disks 15 projecting through a recess 16 formed in the cap and these disks engage the adjacent part of the lining for moving the same laterally through the instrumentality of the nuts as will be obvious. Locking shims 17 are provided for retaining the nuts and the disks thereof in adjusted position and the tongues 18 of said locking shims are adapted to be bent at right angles to the body portion thereof for engaging the flat sides of the nuts as suggested in Figure 1 of the drawings.

From the above description and disclosure of the drawings, it will be obvious that we have provided an adjustable bearing for compensating wear and endwise movement, and the adjustment is accomplished by moving one or both of the nuts 13 and 14 in outward directions, and the disks thereof will move the parts of the lining 9 accordingly.

It is thought from the foregoing description that the advantages and novel features of our invention will be readily apparent.

We desire it to be understood that we may make changes in the construction and in the combination and arrangement of the several parts, provided that such changes fall within the scope of the appended claims.

Having described the invention what is claimed is:—

1. In a bearing, a cap, depending portions formed on said cap and being provided with threaded openings, a sectional lining arranged in said cap, a bolt threadedly mounted in said threaded openings, a pair of nuts on said bolt, and means formed with said nuts and engageable with the sections of the lining for laterally adjusting the same.

2. In a bearing, a cap, a sectional lining arranged in said cap, portions depending from said cap and being provided with aligned threaded openings, a bolt threadedly mounted in said openings, nuts carried by said bolt, a disk formed on each bolt and passing into recesses formed in the sections of the lining for engagement with the latter for moving the same laterally, and means for retaining the nuts in adjusted positions.

3. In a bearing, a cap, portions depending from said cap and being provided with aligned threaded openings, a bolt arranged in said openings, nuts carried by said bolt, a two part lining arranged in said cap, and each part being provided with a semi-circular recess, disks formed with said nuts and disposed in said recesses for engagement with the parts for moving the latter laterally and shims surrounding the bolts and provided with means for engaging the nuts to retain the same in adjusted positions.

4. In a bearing, a cap, depending portions formed with said cap and being provided with threaded aligned openings, a two part lining arranged in said bearing and each part being provided with diagonally disposed inclined confronting inner edges extending at their inner ends into a recess, a bolt threadedly mounted in said openings, nuts on said bolt, disks formed on the confronting faces of said nuts and passing through a recess formed in the cap and arranged in the recesses of the parts of the lining for engagement therewith, for moving the same laterally, and locking means arranged on said bolt and engageable with the nuts for retaining the same in adjusted positions.

In testimony whereof we affix our signatures.

MARTHA JONES.
THOMAS H. FOREHAND.